3,264,732
METHOD OF WELDING
John J. Fannon, Jr., Grosse Pointe Park, Mich., assignor to Hupp Corporation, Cleveland, Ohio, a corporation of Ohio
Original application Nov. 3, 1961, Ser. No. 150,017. Divided and this application Apr. 20, 1965, Ser. No. 465,813
3 Claims. (Cl. 29—487)

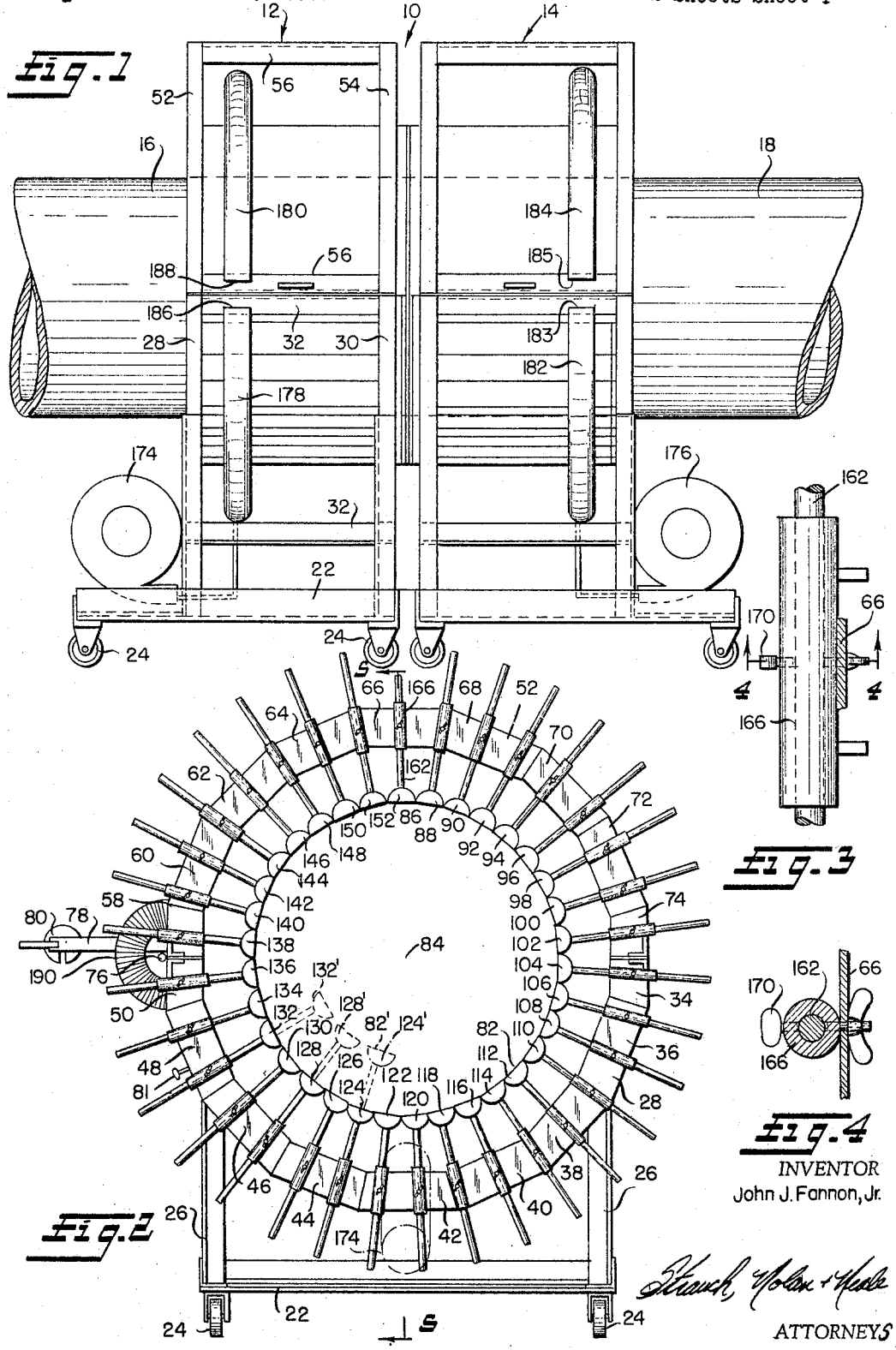

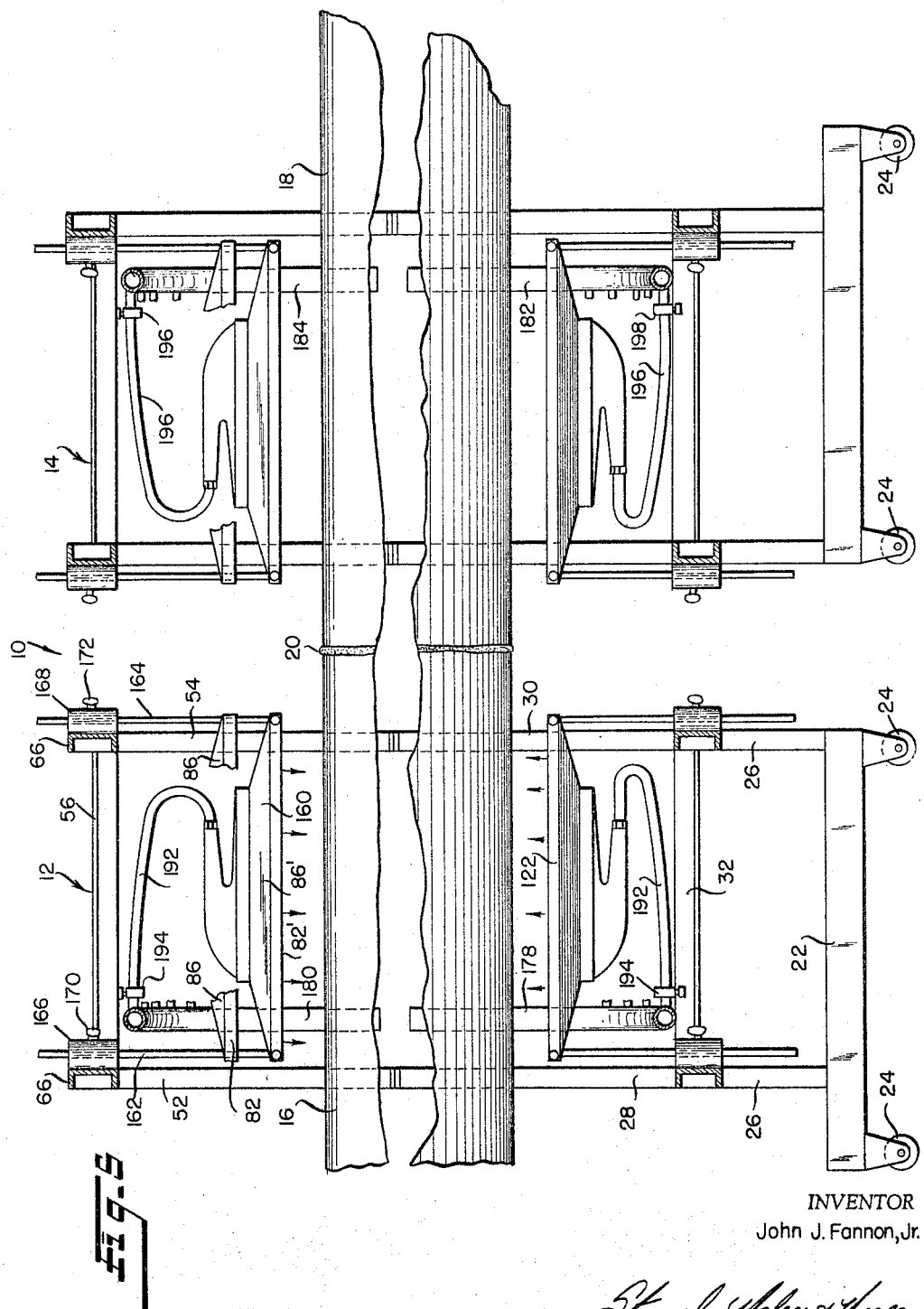

This application is a division of copending application No. 150,017 filed November 3, 1961, for Heating Apparatus, which is now abandoned.

The present invention relates to improvements in gas burning infrared generating heating apparatus and more particularly to such apparatus for heating relatively large diameter cylindrical objects such as metal pipe as an adjunct to welding thereof.

In welding together abutting ends of pipe sections of large diameter, unless auxiliary heat sources are provided to supplement the heat from the welding torch or welding electrode, an excessive amount of time is required to make the weld due to the heat loss to the portions of the pipe sections adjacent the joint which form an undesirably effective heat sink and imperfect and highly stressed welds result due to such heat loss and to the widely circumferentially varying temperatures about the weld as the weld is being made. Once the welding torch or electrode is moved from any given position about the circumference of the pipe joint, the molten metal at that position will rapidly solidify and be rapidly chilled due to the transfer of the heat from the relatively small molten zone to the large relatively cold adjoining portions of the pipe. This results in a highly stressed weld joint.

To overcome these problems it is desirable while the welding operation is being performed to heat the ends of the pipe sections a short distance back of the joint to reduce the otherwise high temperature gradient adjacent the weld zone and thereby reduce the amount of the heat conducted away from the weld zone, and to maintain the entire circumferential portions of the abutting pipes at a uniform elevated temperature to reduce stresses set up during the welding operation. In addition, after welding of the joint is completed, it is desirable to heat the weld and adjacent parts to a sufficiently high temperature to anneal the grain structure of the metal at and adjacent the weld joint to relieve any residual stresses therein.

The primary object of this invention is to provide an apparatus which is adapted for pre-heating pipe section abutting ends as a preliminary to holding such ends together, for maintaining the heating of said sections during the actual welding operation and/or for annealing the completed weld joint immediately subsequent to its completion.

A further important object of this invention is to provide an improved method of welding together abutting ends of pipe sections by which a circumferentially uniform temperature is established as a preliminary to and maintained during the welding together of the abutting pipe section ends.

A further object of this invention is to provide a method of welding together abutting ends of pipe sections by which a circumferentially uniform elevated temperature is established in the region of the pipe adjacent the ends to be welded prior to initiation of the welding operation and is maintained throughout the welding operation and for a sufficient time subsequent thereto to assure proper annealing of the welded joint.

A further object of the present invention is to provide a new and improved apparatus for resiliently heating and maintaining hot the adjacent ends of the pipe sections to be welded together, which may be utilized during the welding of the pipe joints to maintain the temperature of the pipe section end regions and which may be utilized after completion of the weld joint to anneal the joint.

More specifically, it is an object of this invention to provide a gas burning infrared generating heating apparatus defining an oven having a pair of axially separable sections each providing a substantially cylindrical visibly radiant internal wall for irradiation of a portion of a pipe disposed therein.

A further object of this invention is to provide an oven having a substantially cylindrical internally radiant wall which is selectively adjustable and operable to accommodate work pieces of various cross sections therein while maintaining a desirably optimum close spacing between the external surface of a work piece and the internal radiant face of such wall.

A further object of this invention is to provide an oven for subjecting portions of elongated cylindrical objects to externally applied infrared irradiation which is formed of separable segments which can be readily separated and reassembled to permit insertion and removal of an elongated work piece into and from such oven.

These and other objects of the present invention will become more fully apparent by reference to the appended claims and as the following detailed description proceeds in reference to the accompanying drawings which are each drawn to scale and wherein:

FIGURE 1 is a front elevation view of the apparatus of the present invention with its two parts in their convergent positions for preheating or annealing a joint;

FIGURE 2 is a left side elevational view of the apparatus of FIGURE 1;

FIGURE 3 is an elevational view of one of the infrared generators support collars;

FIGURE 4 is a sectional view taken substantially along the line 4—4 of FIGURE 3; and FIGURE 5 is a sectional view taken substantially along the line 5—5 of FIGURE 2 and illustrating the two parts of the apparatus in their divergent position to permit welding of a joint between the abutting ends of a work piece pipe extending therethrough.

Referring now to the drawings in detail and particularly to FIGURES 1 and 5, the heating apparatus or oven 10 comprises two sections 12 and 14 which are movable between a convergent position as shown in FIGURE 1 and a divergent position such as shown in FIGURE 5.

In both their FIGURE 1 and FIGURE 5 positions, the oven sections 12 and 14 surrounded regions of the associated pipe sections 16 and 18 which are to be butt welded together in a circumferential band at their abutting ends as indicated at 20 in FIGURE 5.

The oven section 12 includes a frame support structure comprising a hollow rectangular base frame 22 formed of rigidly interconnected angle iron members and mounted upon casters 24. Upstanding legs 26 fixed to frame 22 at their lower ends rigidly support axially spaced semi-circular frame sections 28 and 30 which are rigidly interconnected by cross bars 32. As is most clearly shown in FIGURE 2 in reference to the semi-circular frame member 28, the frame members 28 and 30 are formed of a plurality of segmental channel shaped members 34 through 50 butt welded together in end to end relation. The upper portion of the frame structure of the oven section 12 is similarly formed of a pair of semi-circular frame members 52 and 54 interconnected by the tie rods 56. As is best illustrated in FIGURE 2 in reference to the frame member 52, the frame members 52 and 54 are formed of a plurality of segments 58–74 of channel shape in cross section butt welded together in end to end relation. Frame members 28, 30, 52 and 54 thus define a substantially cylindrical opening through oven section 12.

The upper frame section is pivotally mounted to the lower frame section by a hinge construction indicated in FIGURE 2 at 76. A laterally extending arm 78 is rigidly fixed to the upper frame section and is adapted to support counter-weight 80 to facilitate pivotal movement about of the upper frame section about the axis of the hinge 76 to an open position in which arm 78 engages a stop 81.

The frame structure of the oven section 14 is identical with that of the oven section 12. When the upper frame sections of oven sections 12 and 14 are both open, the pipe sections 16 and 18 can be lowered into or lifted from the oven sections.

Referring to FIGURE 2, each of the oven sections 12 and 14 are formed with a substantially cylindrical internal wall 82 concentric with the longitudinal axis 84 of the oven section. Wall 82 while being substantially cylindrical is actually polygonal in cross section, being defined by the substantially planar radiant faces of a plurality of gas burning infrared generators 86-152.

Infrared generators 86-152, are preferably of one of the constructions illustrated in my co-pending application Serial No. 50,421, filed August 18, 1960, for Heating Apparatus and Method, now U.S. Patent No. 3,228,113, in which the radiant wall of the infrared generator is so constructed as to be thermally isolated from the housing which cooperates therewith to define a plenum at the inlet side to the perforated wall and which is of such an extent relative to the sides of the plenum defining housing as to shield that housing from radiation directed toward the generator through the plane of the radiant face of the radiant wall. When so constructed, the wall 82 is a substantially uninterrupted wall of through perforated ceramic tiles or multiple ply screens shielding the generator housing from infrared irradiation either directly from the other generators or reflected from the external surface of the pipe sections 16 and 18 to be heated. Due to the high intensity heat resulting from the close proximity between the external surfaces of pipe sections 16 and 18 and the wall 82, ceramic tiles are definitely preferred.

As indicated 124', 128' and 132' the infrared generators 86-152 are mounted so that certain uniformly circumferentially spaced ones of these generators can be moved radially toward the axis 84 from their normal position forming a part of wall 82 into circumferentially juxtaposed relation to define a wall 82' of lesser diameter than that of wall 82 to accommodate pipes of lesser diameter than those indicated at 16 and 18 while maintaining the desired close spacing between the generator radiant faces and the pipe section surfaces. The exact mode of mounting of the infrared generators 86-152 is best illustrated in reference to the generator 86 in FIGURE 5. Generator 86 is illustrated in its radially inward position at 86' in FIGURE 5, its normal position being indicated in that figure by its ends designated at 86. The housing 160 of the generator 86 is adjustably pivotally supported at its opposite ends on a pair of rods 162 and 164 which extend respectively through the longitudinal openings in the collars 166 and 168 fixed to the segment 66 of the frame members 52 and 54 respectively. The pivotal support of the generators permits minor adjustment of their positions so that they properly fit together in circumferentially juxtaposed relation. Once this adjustment is made, the generators are rigidly clamped to their support rods to prevent further unpremeditated movement of the generators. Rod 162 is axially fixed within the bore of collar 66 by a thumb set screw 170 and rod 164 axially fixed in the bore of collar 168 by a thumb set screw 172.

The infrared generators of the oven section 14 are similarly mounted and arranged.

Referring to FIGURE 1, the oven sections 12 and 14 are each provided with a pre-mixing unit 174 and 176 connected to a suitable source of gaseous fuel and adapted to pre-mix that fuel with sufficient air from the atmosphere to effect complete combustion of the fuel when ignited at the wall 82. The oven sections 12 and 14 are each provided with a pair of semi-circular manifolds 178, 180, 182 and 184, manifold section 178 being fixed to and supported by the lower section of the frame structure of section 12, manifold 180 being fixed to the upper half of the frame structure section 12, manifold 182 being fixed to the lower half of the frame structure of the oven section 14 and manifold 184 being fixed to the upper half of the frame structure of the oven section 14. The manifolds 178 and 180 are closed at their ends 186 and 188 respectively and interconnected by a flexible manifold section 190 at their opposite ends as is best illustrated in FIGURE 2 to permit fluid communication therebetween. Manifolds 182 and 184 are similarly closed at their ends 183 and 185 and interconnected by a flexible manifold section (not shown) at their opposite ends. Intermixed gaseous fuel and air is discharged from the pre-mixing units 174 and 176 into the manifolds 178 and 182 respectively and distributed therethrough through the interconnecting flexible manifold sections to the manifolds 180 and 184 respectively.

As is best illustrated in FIGURE 5, the infrared generators 86 through 152 are each individually connected through a flexible conduit 192 and a rigidly mounted manually operable shut-off valve 194 to one of the manifold sections 178 or 180. By this construction each of the infrared generators 86-152 is radially movable relative to the axis 84 (FIGURE 2) and, when certain of the infrared generators are positioned at a location internally of the cylindrical wall 82, such as at 82', the remaining infrared generators can be shut off by the associated manual shut-off valves 194 without interruption of flow of intermixed gaseous fuel and air to the ones of the infrared generators positioned radially inwardly to define the smaller diameter infrared radiant wall 82'.

The infrared generators of the oven section 14 are each similarly individually connected by flexible conduits 196 and rigidly mounted manually operable shut-off valves 198 to the manifolds 182 and 184.

In operation, and in the practice of the method of the present invention, the oven sections 12 and 14 are opened by pivoting their upper halves about the hinges 76, the pipe sections 16 and 18 are placed therein in abutment, and the oven sections 12 and 14 reclosed. The oven sections 12 and 14 are moved together to the position illustrated in FIGURE 1 where their annular rings of infrared generators are in substantially axially juxtaposed coaxial relation to define one continuous cylindrical wall surrounding and substantially coaxial with the common axis of the portions of the pipe sections 16 and 18 immediately adjacent the ends thereof to be butt welded. The pre-mixing units 174 and 176 are then turned on and connected with a gaseous fuel supply main and the infrared generators of both sections 12 and 14 are then ignited by any suitable ignition system such as by spark gap ignitors or pilots. When the generators reach their operating temperature, preferably in the order of 1650° F. to 2300° F., their radiant faces will emit infrared radiation toward the external surface of the portions of pipe sections 16 and 18 disposed within the oven sections 12 and 14 to rapidly heat them to the desired elevated temperature, as a preliminary to initiation of the welding operation. When this desired temperature is reached, the oven sections 12 and 14 are separated axially to the positions illustrated in FIGURE 5 with respect to the ends of the pipe sections 16 and 18. When in this position, there is sufficient space between the sections 12 and 14 to permit the welder to form the joint 20 by use of either a welding torch or welding electrode. During the welding operation, the heating of the pipe sections 16 and 18 is maintained and the portion of the pipe sections 16 and 18 adjacent the joint 20 are maintained sufficiently hot so that the transfer of heat from the molten metal at the point where the actual welding is being performed is relatively minor. When the entire joint 20 has been completed, the oven sections 12 and 14 are placed again in their convergent positions as illustrated in FIGURE 1 without interruption of the heating of the pipe sections 16 and 18 and are maintained in that position a sufficient period of time to properly anneal the joint 20 to eliminate any residual stresses therein or in the adjacent metal of pipe sections 16 and 18.

By way of specific example, one physical embodiment of the unit as illustrated in FIGURE 2 with all of the infrared generators 86–152 retracted to their position as part of the wall 82, is adapted to accommodate a twenty-four inch outside diameter pipe. When the infrared generators are in their radially inner position as a part of the cylindrical surface 82', that unit is adapted to accommodate a pipe of twelve inches in diameter. By way of further illustration, the distance between the external sides of the channel segments 34 and 50 is in that embodiment four feet-three inches. The axial length of each of the frame structures of the upper portion of the units 12 and 14 of that physical embodiment is one foot ten and one-fourth inches and the overall height of that unit, as viewed in FIGURE 1, from the support floor on which casters 24 rest is five feet three and one-half inches.

The present invention may be embodied in other specific forms without departing from the spirit and essential characteristic thereof, the present embodiment is, therefore, to be considered in all respects as illustrative only and not restrictive, the scope of the invention being indicated by the appended claims rather than by the foregoing description.

What is claimed is:

1. A method of welding together the ends of a pair of aligned pipe sections comprising the steps of establishing a plurality of circumferentially uniformly spaced beams of radiant energy concentrated upon the external surface of each of said pipe sections over portions thereof of predetermined axial extent from their said abutting ends to heat said portions as a preliminary to welding to a temperature sufficient to prevent undue heat loss from the welding zone during welding, shifting said beams axially of said pipe sections away from their said abutting ends only sufficiently to provide access to their said abutting ends for welding while maintaining the heating of each of the said pipe sections, and welding together the said abutting ends of said pipe sections while said pipe sections are continuously subjected to infrared irradiation at the axially shifted positions of said beams.

2. The method defined in claim 1 comprising the further step of thereafter shifting said beams to irradiate the welded joint of said pipe section abutting ends to anneal said joint.

3. A method of welding together a pair of metallic objects along a predetermined band comprising the steps of subjecting portions of each of said objects adjacent said band to the influence of beams of infrared irradiation from gas burning infrared generators having visibly radiant faces to heat said portions to elevated temperatures, shifting said beams away from said band sufficiently to provide access thereto while maintaining the irradiation of said objects, and welding said objects together along said band while said irradiation of said objects is maintained.

References Cited by the Examiner

UNITED STATES PATENTS

| | | | |
|---|---|---|---|
| 2,657,660 | 11/1953 | Crowe | 29—498 XR |
| 2,722,735 | 11/1955 | Beamish | 29—298 XR |
| 2,819,517 | 1/1958 | Pursell | 29—487 XR |
| 3,125,804 | 3/1964 | Thome | 29—487 |

JOHN F. CAMPBELL, *Primary Examiner.*